(12) United States Patent
Chang et al.

(10) Patent No.: US 8,630,826 B2
(45) Date of Patent: Jan. 14, 2014

(54) ELECTRONIC DEVICE AND METHOD FOR CONTROLLING PROBE MEASUREMENTS

(75) Inventors: Chih-Kuang Chang, New Taipei (TW); Zheng-Cai She, Shenzhen (CN); Zhong-Kui Yuan, Shenzhen (CN); Li Jiang, Shenzhen (CN); Xiao-Guang Xue, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 209 days.

(21) Appl. No.: 13/245,879

(22) Filed: Sep. 27, 2011

(65) Prior Publication Data
US 2012/0239369 A1    Sep. 20, 2012

(30) Foreign Application Priority Data
Mar. 15, 2011   (CN) .......................... 2011 1 0061787

(51) Int. Cl.
*G06F 7/60*    (2006.01)
*G06F 17/10*   (2006.01)

(52) U.S. Cl.
USPC .................................................. 703/2; 703/13

(58) Field of Classification Search
USPC ........................................................ 703/13, 2
See application file for complete search history.

(56) References Cited

U.S. PATENT DOCUMENTS

| 4,935,106 | A  | * | 6/1990 | Liston et al. .................. 205/778 |
|---|---|---|---|---|
| 7,696,748 | B2 | * | 4/2010 | Schlicker et al. ............. 324/240 |
| 8,406,861 | B2 | * | 3/2013 | Bigio et al. .................... 600/478 |
| 2004/0169021 | A1 | * | 9/2004 | Baker et al. ............. 219/121.63 |
| 2006/0062276 | A1 | * | 3/2006 | Conforti ........................ 374/163 |
| 2006/0116564 | A1 | * | 6/2006 | Mintchev et al. ............. 600/350 |
| 2008/0177258 | A1 | * | 7/2008 | Govari et al. ................... 606/41 |
| 2009/0168838 | A1 | * | 7/2009 | Harr et al. ...................... 374/163 |
| 2009/0180672 | A1 | * | 7/2009 | Ishiyama ...................... 382/118 |
| 2011/0134113 | A1 | * | 6/2011 | Ma et al. ....................... 345/419 |

* cited by examiner

*Primary Examiner* — Dwin M Craig
(74) *Attorney, Agent, or Firm* — Altis Law Group, Inc.

(57) ABSTRACT

A method controls probe measurement using an electronic device. The method receives user-defined identification data of a probe if a preset configuration file is not stored in a storage device of the electronic device, and fits a three dimensional (3D) model of the probe according to the user-defined identification data of the probe. The method further updates the user-defined identification data of the probe if the fitted 3D model does not match the probe, or stores the user-defined identification data of the probe in a user-defined configuration file if the fitted 3D model matches the probe, and controls the probe to execute measurement according to the user-defined configuration file.

16 Claims, 4 Drawing Sheets

ELECTRONIC DEVICE AND METHOD FOR CONTROLLING PROBE MEASUREMENTS

BACKGROUND

1. Technical Field

Embodiments of the present disclosure relate to measurement technology, and particularly to an electronic device and method for controlling probe measurements using the electronic device.

2. Description of Related Art

Measurement is an important phase in manufacturing and is closely related to product quality. In recent years, probe measurement has been used to obtain a plurality of point data of an object by contacting a large number of points on a surface of the object using a probe, processing the data in the points, and subsequently extracting boundary elements including boundary points and boundary characteristics of the object, in order to form a profile image of the object. However, if a configuration file of a probe is not pre-stored in a storage device, the current measuring method cannot measure the object using the probe. Therefore, a more efficient method for controlling probe measurement using an electronic device is desired.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
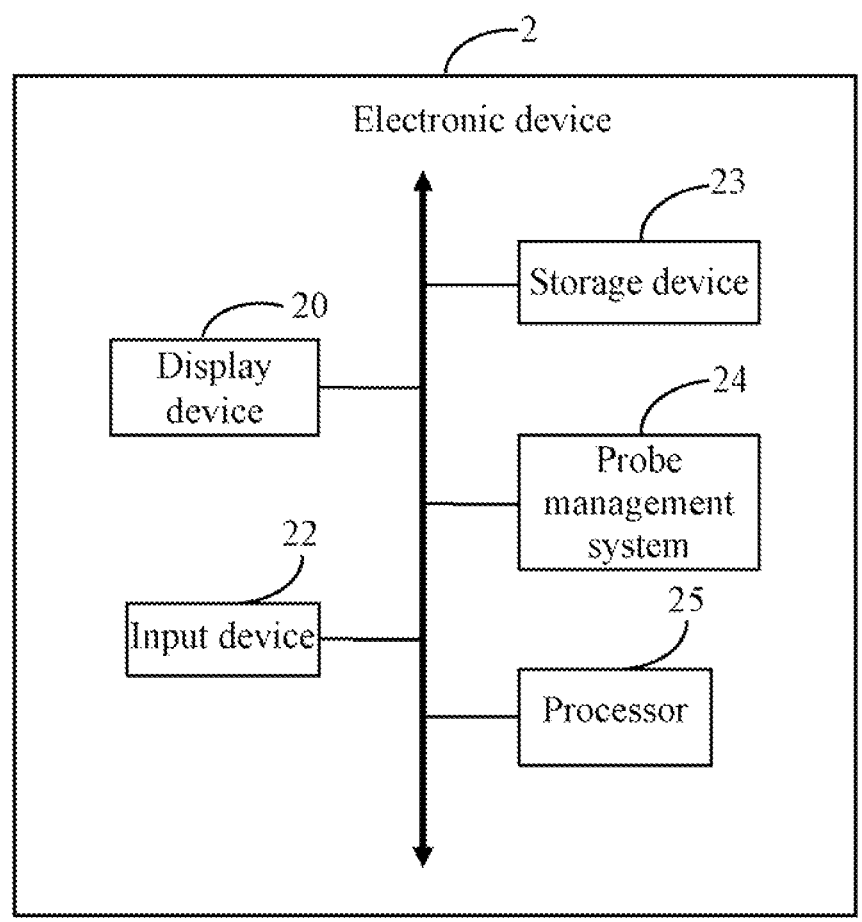
FIG. 1 is a block diagram of one embodiment of an electronic device including a probe management system.
Figure 4:
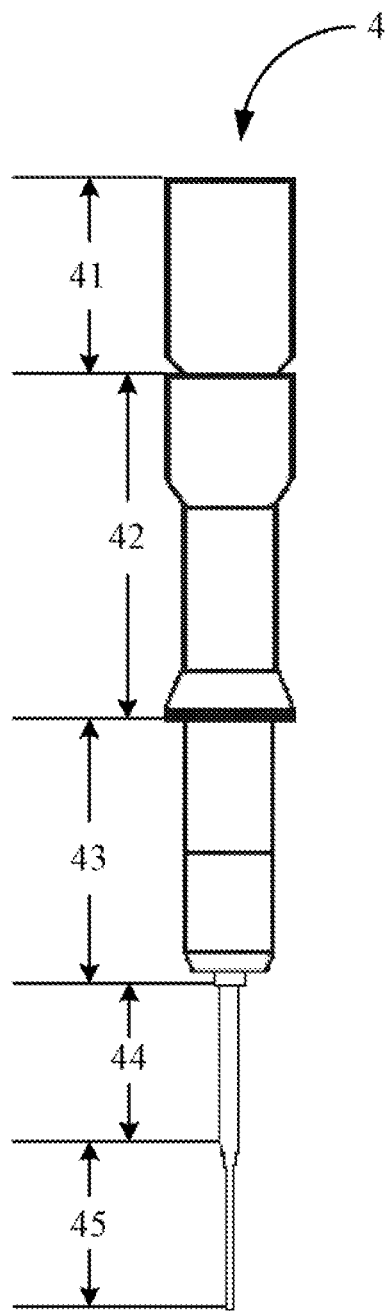
FIG. 4 is an exemplary schematic diagram of a probe.

FIG. 1 is a block diagram of one embodiment of an electronic device 2 including a probe management system 24. In the embodiment, the electronic device 2 further includes a display device 20, an input device 22, a storage device 23, and at least one processor 25. The electronic computer 2 is connected with an object measuring machine, and a probe that is electronically connected to the object measuring machine. The probe is used to detect one or more points on a surface of an object to be measured, in order to extract boundary elements including boundary points and boundary characteristics of the object. An exemplary schematic diagram of a probe 4 is shown in FIG. 4. In one embodiment, the probe 4 may include parts of a cover 41, a sensor 43, an extended part 42 of the sensor 43, a tip 45, and an extended part 44 of the tip 45. The probe management system 24 may be used to generate a user-defined configuration file of the probe 4 if no preset configuration file of the probe 4 can be found in the storage device 23, and control the probe 4 to measure the object according to the user-defined configuration file. A detailed description will be given in the following paragraphs.

The display device 20 may be used to display measuring results of the object, and the input device 22 may be a mouse or a keyboard used to input computer readable data.

Figure 2:
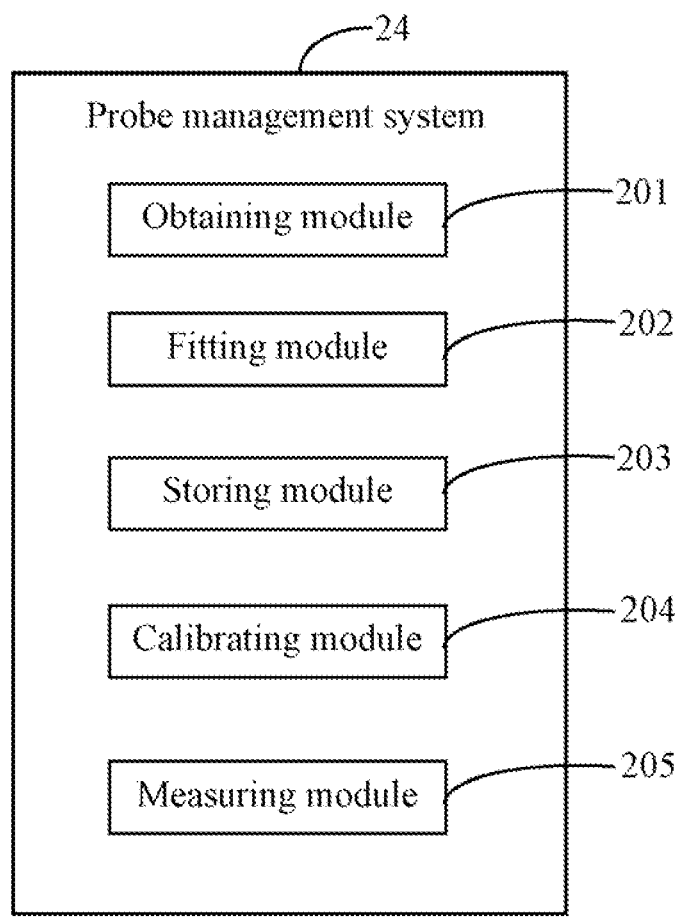
FIG. 2 is a block diagram of function modules of the probe management system included in the electronic device of FIG. 1.

FIG. 2 is a block diagram of function modules of the probe management system 24 in the electronic device 2. In one embodiment, the probe management system 24 may include one or more modules, for example, an obtaining module 201, a fitting module 202, a storing module 203, a calibrating module 204, and a measuring module 205. The one or more modules 201-205 may comprise computerized code in the form of one or more programs that are stored in the storage device 23 (or memory). The computerized code includes instructions that are executed by the at least one processor 25 to provide functions for the one or more modules 201-205.

Figure 3:
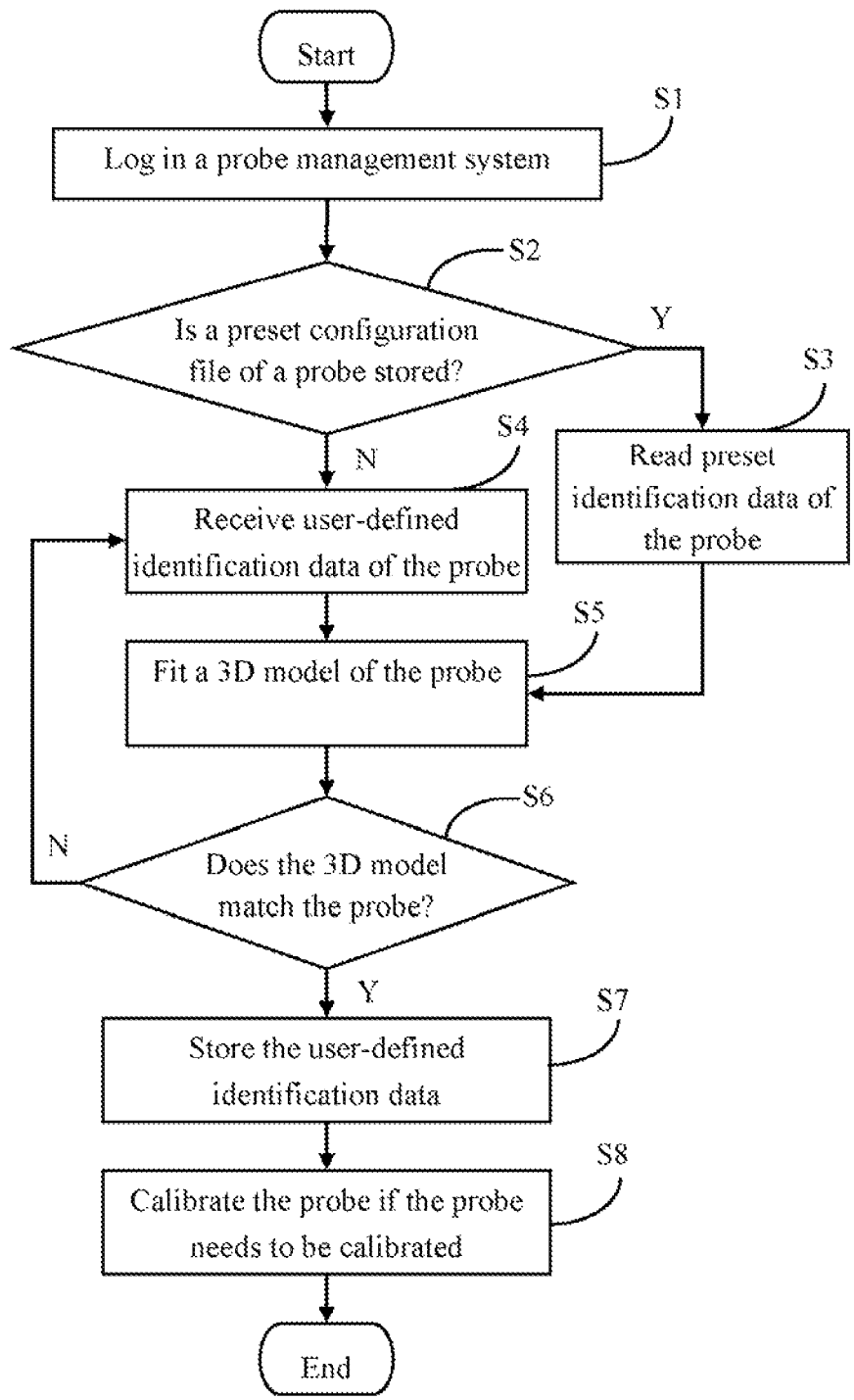
FIG. 3 is a flowchart of one embodiment of a method for controlling probe measurement using the electronic device of the FIG. 1.

FIG. 3 is a flowchart of one embodiment of a method for controlling probe measurement using the electronic device 2. Depending on the embodiment, additional blocks may be added, others removed, and the ordering of the blocks may be changed.

In block S1, a user can log into the probe management system 24 to start the measurement.

In block S2, the obtaining module 201 determines if a preset configuration file of the probe 42 is stored in the storage device 23. If the preset configuration file of the probe 42 is stored in the storage device 23, the procedure goes to block S3. If the preset configuration file of the probe 42 is not stored in the storage device 23, the procedure goes to block S4.

In block S3, the obtaining module 201 reads preset identification data of the probe 4 from the preset configuration file, then the procedure goes to block S5. In one embodiment, the identification data may include, but is not limited to, a type and size of each part of the probe 4.

In block S4, the obtaining module 201 receives user-defined identification data of the probe 4 from the input device 22, then the procedure goes to block S5. As mentioned above, the user-defined identification data may include a type and size of each part of the probe 4.

In block S5, the fitting module 202 fits a three dimensional (3D) model of the probe 4 according to the preset identification data or the user-defined identification data of the probe 4, and displays the fitted 3D model on the display device 20.

In block S6, the fitting module 202 determines if the fitted 3D model matches the probe 4. If the fitted 3D model does not match the probe 4, the procedure returns to block S4, the user updates user-defined identification data of the probe 4, and the obtaining module 201 receives the updated user-defined identification data through the input device 22. If the fitted 3D model matches the probe 4, the procedure goes to block S7. A detailed description of determining if the fitted 3D model matches the probe 4 is as follows.

The fitting module 202 obtains a reference 3D model of the probe 4 from the storage device 23, and compares the reference 3D model with the fitted 3D model. If the fitted 3D model matches the reference 3D model, the fitting module 202 determines that the fitted 3D model matches the probe 4. Otherwise, if the fitted 3D model does not match the reference 3D model, the fitting module 202 determines that the fitted 3D model does not match the probe 4.

In block S7, the storing module 203 stores the user-defined identification data of the probe 4 in a user-defined configuration file corresponding to the probe 4, and stores the user-defined configuration file into the storage device 23.

In other embodiments, the method may further include block S8. In block S8, the calibrating module 204 calibrates the probe 4 when the probe 4 needs to be calibrated, and stores the calibration results in the user-defined configuration file. Then, the measuring module 205 controls the probe 4 to execute measurement according to the user-defined configuration file. In one embodiment, if the user-defined configuration file does not store the calibration results of the probe 4 or a calibrating period (e.g., five days) of the probe 4 expires, the calibrating module 204 determines that the probe 4 needs to be calibrated. If the user-defined configuration file stores the calibration results of the probe 4 and the calibrating period of the probe 4 does not expire, the calibrating module 204 determines that the probe 4 does not need to be calibrated.

In one embodiment, the calibration results may include, but is not limited to, a movement speed of the probe 4, a current diameter of the tip 45 of the probe 4, and a current length of the tip 45. For example, if the current diameter of the tip 45 is less than a first percentage (e.g., 95%) of a reference diameter of the tip 45, or the current length of the tip 45 is less than a second percentage (e.g., 90%) of a reference length of the tip 45, the calibrating module 204 sends an alarm message on the display device 20 to prompt the user to replace the probe 4.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for controlling probe measurement using an electronic device, the method comprising:
    reading preset identification data of a probe from a preset configuration file of the probe upon the condition that the preset configuration file is stored in a storage device of the electronic device, the probe being electronically connected to an object measuring machine that is connected with the electronic device;
    receiving user-defined identification data of the probe from an input device of the electronic device upon the condition that the preset configuration file is not stored in the storage device;
    fitting a three dimensional (3D) model of the probe according to the preset identification data or the user-defined identification data of the probe, and displaying a fitted 3D model of the probe on a display device of the electronic device;
    determining if the fitted 3D model of the probe matches a reference 3D model of the probe;
    updating the user-defined identification data of the probe through the input device upon the condition that the fitted 3D model of the probe does not match the reference 3D model of the probe; and
    storing the user-defined identification data of the probe in a user-defined configuration file corresponding to the probe upon the condition that the fitted 3D model of the probe matches the reference 3D model of the probe, and controlling the probe to execute measurement according to the user-defined configuration file.

2. The method according to claim 1, further comprising:
    calibrating the probe upon the condition that the probe needs to be calibrated, and storing the calibration results in the user-defined configuration file.

3. The method according to claim 2, further comprising:
    determining that the probe needs to be calibrated upon the condition that the user-defined configuration file does not store calibration results of the probe or a calibrating period of the probe expires; and
    determining that the probe does not need to be calibrated upon the condition that the user-defined configuration file stores the calibration results of the probe and the calibrating period of the probe does not expire.

4. The method according to claim 1, wherein the probe comprises parts of a cover, a sensor, an extended part of the sensor, a tip, and an extended part of the tip.

5. The method according to claim 4, wherein the user-defined identification data of the probe comprise a type and size of each part of the probe.

6. An electronic device, comprising:
    a storage device;
    at least one processor; and
    one or more modules that are stored in the storage device and are executed by the at least one processor, the one or more modules comprising instructions:
    to read preset identification data of a probe from a preset configuration file of the probe upon the condition that the preset configuration file is stored in the storage device, the probe being electronically connected to an object measuring machine that is connected with the electronic device;
    to receive user-defined identification data of the probe from an input device of the electronic device upon the condition that the preset configuration file is not stored in the storage device;
    to fit a three dimensional (3D) model of the probe according to the preset identification data or the user-defined identification data of the probe, and display a fitted 3D model of the probe on a display device of the electronic device;
    to determine if the fitted 3D model of the probe matches a reference 3D model of the probe;
    to update the user-defined identification data of the probe through the input device upon the condition that the fitted 3D model of the probe does not match the reference 3D model of the probe; and
    to store the user-defined identification data of the probe in a user-defined configuration file corresponding to the probe upon the condition that the fitted 3D model of the probe matches the reference 3D model of the probe, and control the probe to execute measurement according to the user-defined configuration file.

7. The electronic device according to claim 6, wherein the one or more modules further comprise instructions:
    to calibrate the probe upon the condition that the probe needs to be calibrated, and store the calibration results in the user-defined configuration file.

8. The electronic device according to claim 7, wherein the one or more modules further comprises instructions:
    to determine that the probe needs to be calibrated upon the condition that the user-defined configuration file does not store calibration results of the probe or a calibrating period of the probe expires; and
    to determine that the probe does not need to be calibrated upon the condition that the user-defined configuration file stores the calibration results of the probe and the calibrating period of the probe does not expire.

9. The electronic device according to claim 6, wherein the probe comprises parts of a cover, a sensor, an extended part of the sensor, a tip, and an extended part of the tip.

10. The electronic device according to claim 9, wherein the user-defined identification data of the probe comprise a type and size of each part of the probe.

11. A non-transitory storage medium having stored thereon instructions that, when executed by a processor of an electronic device, causes the electronic device to perform a method for controlling probe measurement, the method comprising:

reading preset identification data of a probe from a preset configuration file of the probe upon the condition that the preset configuration file is stored in a storage device of the electronic device, the probe being electronically connected to an object measuring machine that is connected with the electronic device;

receiving user-defined identification data of the probe from an input device of the electronic device upon the condition that the preset configuration file is not stored in the storage device;

fitting a three dimensional (3D) model of the probe according to the preset identification data or the user-defined identification data of the probe, and displaying a fitted 3D model of the probe on a display device of the electronic device;

determining if the fitted 3D model of the probe matches a reference 3D model of the probe;

updating the user-defined identification data of the probe through the input device upon the condition that the fitted 3D model of the probe does not match the reference 3D model of the probe; and storing the user-defined identification data of the probe in a user-defined configuration file corresponding to the probe upon the condition that the fitted 3D model of the probe matches the reference 3D model of the probe, and controlling the probe to execute measurement according to the user-defined configuration file.

12. The non-transitory storage medium according to claim 11, wherein the method further comprises: calibrating the probe upon the condition that the probe needs to be calibrated, and storing the calibration results in the user-defined configuration file.

13. The non-transitory storage medium according to claim 12, wherein the method further comprises:

determining that the probe needs to be calibrated upon the condition that the user-defined configuration file does not store calibration results of the probe or a calibrating period of the probe expires; and determining that the probe does not need to be calibrated upon the condition that the user-defined configuration file stores the calibration results of the probe and the calibrating period of the probe does not expire.

14. The non-transitory storage medium according to claim 11, wherein the probe comprises parts of a cover, a sensor, an extended part of the sensor, a tip, and an extended part of the tip.

15. The non-transitory storage medium according to claim 14, wherein the user-defined identification data of the probe comprise a type and size of each part of the probe.

16. The non-transitory storage medium according to claim 11, wherein the medium is selected from the group consisting of a hard disk drive, a compact disc, a digital video disc, and a tape drive.

* * * * *